US 8,271,437 B2

(12) United States Patent
Arcese et al.

(10) Patent No.: US 8,271,437 B2
(45) Date of Patent: Sep. 18, 2012

(54) MANAGING LOCKS ACROSS DISTRIBUTED COMPUTING NODES

(75) Inventors: Mauro Arcese, Fontana Liri (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/181,264

(22) Filed: Jul. 28, 2008

(65) Prior Publication Data

US 2010/0023521 A1    Jan. 28, 2010

(51) Int. Cl.
*G06F 7/00* (2006.01)
(52) U.S. Cl. .................. 707/613; 707/704; 707/781
(58) Field of Classification Search .................. None
See application file for complete search history.

(56) References Cited

U.S. PATENT DOCUMENTS

| | | | |
|---|---|---|---|
| 5,682,537 A * | 10/1997 | Davies et al. ............... | 710/200 |
| 5,946,685 A | 8/1999 | Cramer et al. | |
| 6,374,285 B1 * | 4/2002 | Scales et al. ............... | 718/104 |
| 6,389,420 B1 * | 5/2002 | Vahalia et al. ............. | 707/8 |
| 6,523,066 B1 | 2/2003 | Montroy et al. | |
| 6,546,443 B1 | 4/2003 | Kakivaya et al. | |
| 6,550,017 B1 * | 4/2003 | Moiin et al. .............. | 714/4.4 |
| 7,093,230 B2 | 8/2006 | E et al. | |
| 7,337,290 B2 | 2/2008 | Rajamani et al. | |
| 7,526,479 B2 * | 4/2009 | Zenz .......................... | 707/8 |
| 2002/0078119 A1 * | 6/2002 | Brenner et al. ............ | 709/102 |
| 2005/0289143 A1 * | 12/2005 | Oshri et al. ............... | 707/8 |

OTHER PUBLICATIONS

Jim Gray, Andreas Reuter, Transaction Processing: Concepts and Techniques, pp. 449-488, 1993, Morgan Kaufmann Publishers.
G. Taubenfeld, The Black-White Bakery Alrogithm and Related Bounded-Space, Adaptive, Local-Spinning and FIFO Algorithms, Lecture Notes in Comp. Sci. 3274, 2004, pp. 56-70.
Distributed Lock Manager; http://en.wikipedia.org/wiki/Distributed_lock_manager; downloaded Jul. 24, 2008.
M. Burrows, The Chubby lock service for loosely-coupled distributed systems, OSDI, Nov. 2006, pp. 1-16, http://labs.google.com/papers/chubby.html.
B. Wallace, Implementing Mutual Exclusion for AJAX, Apr. 5, 2006, http://www.onjava.com/lpt/a/6539.
Lamport's bakery algorithm; http://en.wikipedia.org/wiki/Lamport's_bakery_algorithm; downloaded Jul. 24, 2008.
Bakery algorithm; http://www.cs.umd.edu/~shankar/412-Notes/7-BakeryAlg.html.

* cited by examiner

*Primary Examiner* — Vei-Chung Liang
*Assistant Examiner* — Miranda Huang
(74) *Attorney, Agent, or Firm* — Stephen R. Tkacs; Stephen J. Walder, Jr.; Jeffrey S. Labaw

(57) ABSTRACT

A mechanism for managing locks for one or more resources in a distributed system including multiple distributed computing nodes, is provided. One implementation involves maintaining a database as a shared storage accessible by plural participating nodes for storing shared lock information, each participating node locally managing a local list of locks, the participating nodes cooperating in providing decentralized lock management across the nodes using the local and shared lock information, to achieve granting and releasing of locks for synchronizing access to one or more resources.

18 Claims, 4 Drawing Sheets

MANAGING LOCKS ACROSS DISTRIBUTED COMPUTING NODES

BACKGROUND OF THE INVENTION

1. Field of the Invention

The present invention relates generally to distributed processing and in particular to synchronization using locks in distributed processing.

2. Background Information

A distributed application in a computing environment typically includes multiple cooperating processes which are spread across a group of loosely coupled computing modules (nodes). Each computer in the group has its own address space, runs its own copy of an operating system and runs a number of the application processes. Cooperating application processes on different nodes frequently need to share resources such as data structures, disk arrays and executable programs. However, accesses to these shared resources often have to be synchronized in order to ensure some form of distributed serialization. A conventional way to achieve this synchronization is for applications to use the coordination facilities provided by a distributed lock manager (DLM).

A typical DLM comprises a system to which all the nodes are connected, and that is in charge of granting and releasing locks to the requesting nodes. The DLM contacts the nodes to find an agreement on the granting of the lock. This is necessary to ensure that each node connected to the system agrees on the state of the lock. As such, the system requires a specific process that centrally manages these activities. If the system crashes or becomes unreachable, then the overall process of lock granting/releasing cannot continue. Moreover, a DLM is typically specialized to manage specific types of locks (e.g., locks on rows/tables of a database, locks on shared files, and so on). Such a DLM generally does not allow managing heterogeneous locks of different types.

SUMMARY OF THE INVENTION

The invention provides a method and system of managing locks for one or more resources in a distributed system including multiple distributed computing nodes. One embodiment involves maintaining a database as a shared storage accessible by plural participating nodes for storing shared lock information, each participating node locally managing a local list of locks, the participating nodes cooperating in providing decentralized lock management across the nodes using the local and shared lock information, to achieve granting and releasing of locks for synchronizing access to one or more resources.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
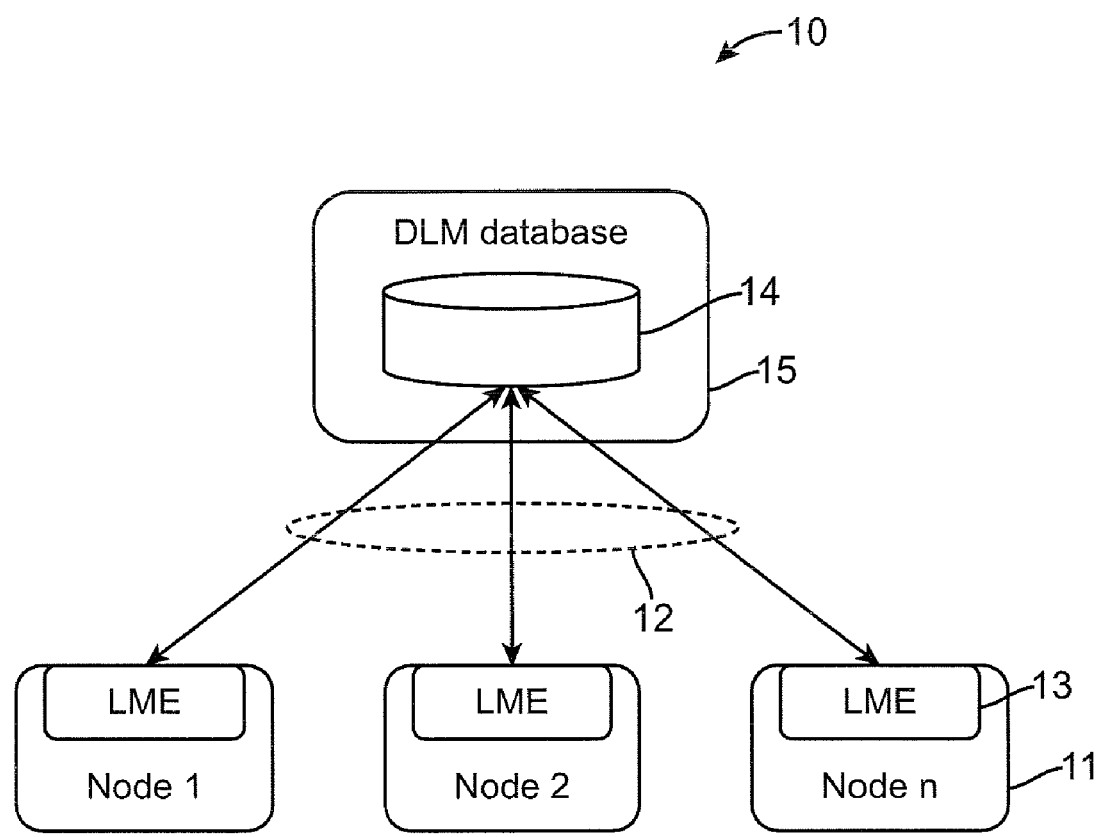
FIG. 1 shows a functional block diagram of a system for managing locks across distributed computing nodes, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for managing locks across distributed computing nodes. One embodiment provides a decentralized lock system (DLS) implementing a lock management method which does not require a central node where the logic of managing locks is concentrated. The decentralized lock system is based on a cooperative behavior obtained by distributing the logic of granting/releasing locks among multiple participating computing nodes (rather than a central lock management system). The only required central element is a relational database where the runtime data are stored. Essentially no lock processing logic is required at the database site. The database is used only as a shared storage accessible by all the participant nodes. All the required lock processing logic is instead embedded into a small component (e.g., released as a shared library) that each participant node loads and exploits. In this way, the DLS utilizes a server-less (enhanced client) architecture rather than a client/server architecture. The DLS further allows managing heterogeneous locks not strictly related to a specific type of resource.

In a preferred embodiment, locks are managed for distributed nodes such that each node manages its local locks in the DLS. Each node manages information related to the grant/release of locks for the applications that are located on that node (i.e., management of the related records in the shared database, generating the heartbeat signals and so on, etc.). Each node desiring access to a resource enters a lock information record (including a lock request) in a database shared by the nodes. A node that enters a lock information record in the shared database receives back a sequence entry number from the database.

Each requesting node desiring access to a resource reads the information request records in the database for that resource. If there is no lock request record in the database with a sequence number less than the sequence number of that requesting node, the DLS indicates "acquired" in the record of the database corresponding to that resource and grants the lock to the requesting node.

If there is a lock request record in the database with a sequence number less than the sequence number of the requesting node, storing in a local list, the requesting node waits for maximum timeout period and then re-reads all the lock request records in the database for that resource. Depending on the value of timeout period compared with what is read in the local list records, the DLS grants the lock or updates the timeout period with a timeout value. The process is repeated until the lock is granted. An example implementation is described below. The local lock list comprises a data structure used by the system to locally store the list of lock requests managed by the current node. The contents of the local lock list are similar to that stored in the shared database, wherein the local lock list contains the lock requests related to the current node while the shared database contains all the lock requests.

The DLS accomplishes its functions based on a variant of the "bakery algorithm". A bakery has a numbering machine at its entrance so that each customer is given a unique number to be served (customer number). Numbers increase by one as each customer enters the store. A global counter displays the customer number that is currently being served. All other customers must wait in a queue until the baker finishes serving the current customer and then the next customer number in queue sequence is displayed. Each customer served loses his customer number and must obtain a new customer number and wait in the queue again to be served by the baker.

In the context of the embodiment of the invention described herein, the customer is the node requesting a lock while the bakery is a shared database module that distributes the entry numbers in an incremental manner. When a node needs to acquire a lock to access a resource, the node generates a new request by creating a new record in a suitable record table defined in the database module. The database module then automatically assigns to this new record an incremental number (ID) that represents the primary key of the record. The ID is then used to manage the lock request as described.

In order to detect a requesting node that may have crashed, a heartbeat field (e.g., a counter) is provided in each lock record, wherein the lock record must be periodically updated by the requesting node that holds the corresponding lock (i.e., the requesting node that a lock for a resource was granted to). If the heartbeat field is not updated within a required time interval, then the granted lock must be considered no longer valid and the related record is removed from the table of the database, making the corresponding resource available.

FIG. 1 shows a functional block diagram of a system 10 implementing the above DLS functions, according to the invention. The system 10 involves multiple nodes 11 (e.g., Node 1, . . . , Node n) connected via a network 12. The DLS includes a lock manager engine (LME) 13 implemented on each participant node 11, wherein each LME 13 for a participant node 11 is configured for managing all the lock requests from a local process of that node. The DLS 10 further includes a shared database (DLM database) 14 implemented on a node 15 accessible from all the other participant nodes 11 via the network 12.

Figure 2:
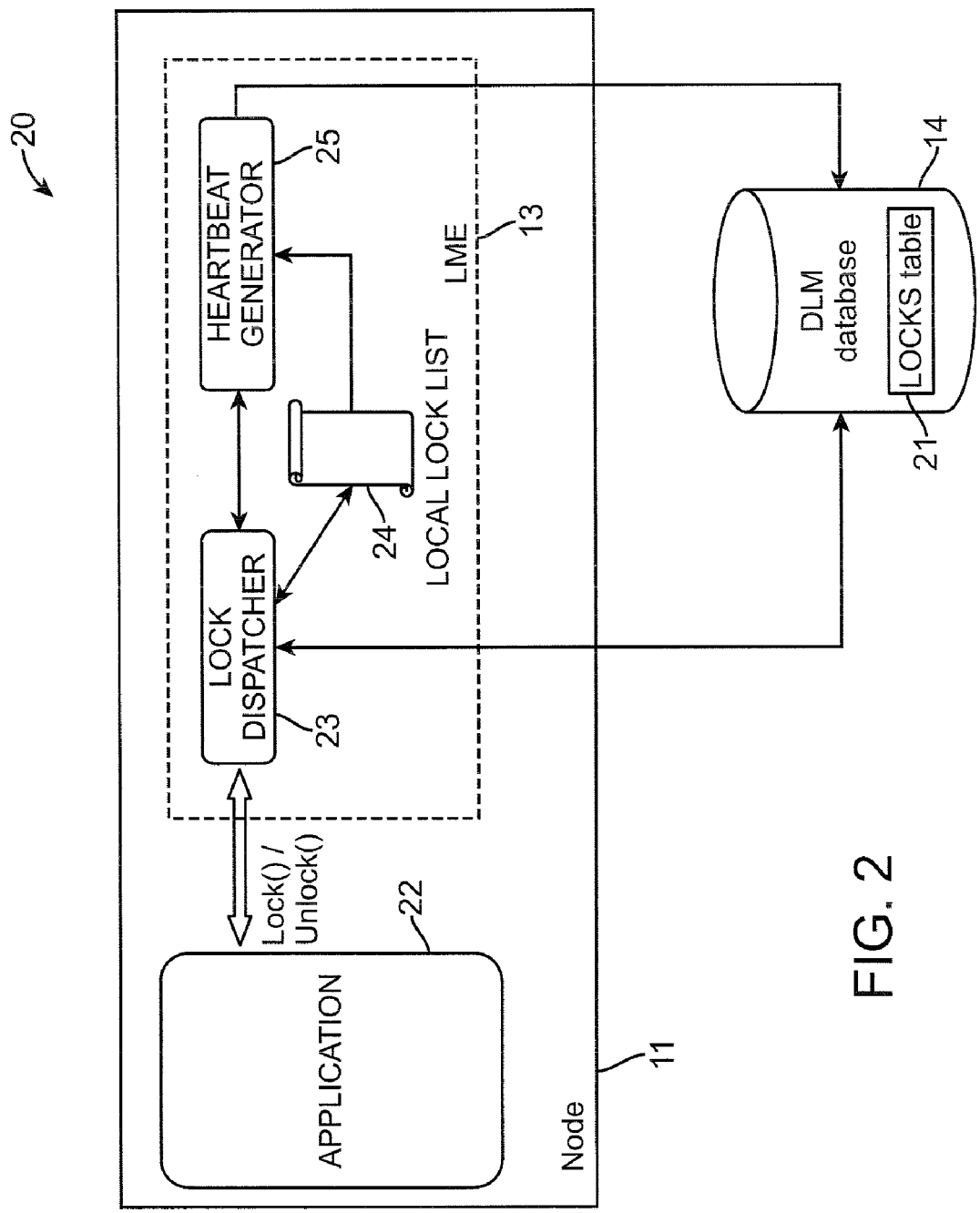
FIG. 2 shows a more detailed functional block diagram of a system for managing locks across distributed computing nodes, according to an embodiment of the invention.

FIG. 2 shows a detailed functional block diagram of an implementation of a DLS 20, according to the invention. The DLM database 14 includes functions that provide a shared storage remotely accessible by all the participant nodes 11. The DLM database 14 includes at least one table 21 (i.e., LOCKS table) containing information about the lock requests from the nodes 11. The DLM database 14 may include additional tables such as a table to store common configuration parameters for the system and/or a table to store debugging/audit information useful to monitor the system, etc. In one example, the LOCKS table 21 includes at least the following fields for each lock record therein:

ID: An incremental integer that the database automatically assigns to a requesting node, represents the primary key of the record.
LOCK_NAME: A logical name for the lock.
NODE_NAME: Name of the node that requested the lock.
LOCK_TYPE: Type of lock with example values including EXCLUSIVE or SHARED.
STATE: State of the lock with example values including WAITING or ACQUIRED.
HEARTBEAT_COUNTER: A counter that must be periodically incremented by the lock requesting node, with a frequency no lower than the value specified by a HEARTBEAT_UPDATE_INTERVAL parameter.
HEARTBEAT_UPDATE_INTERVAL: A value specifying the maximum time interval within which the requesting node must update the heartbeat counter to signal that the requesting node is still alive.

The LME 13 in each node 11 is configured for locally managing the lock requests of one or more applications 22 executing on the corresponding node 11. The LME 13 implements an interface through which its services are provided. In one example, the LME 13 may be embedded in a library that each application 22 which needs functionality of the LME 13 may link and use. An example definition of the interface provided by the LME 13 included at least the following two functions lock( ) and unlock( ).

The lock( ) function acquires a lock with a given name and type, and returns the ID of the granted lock to a requesting application 22. The lock( ) function has the following interface:

```
int lock(String name, int lockType, long timeout,
    CallbackHandler cb)
``` wherein:
name is the logical name of the lock;
lockType can assume one of the two values: SHARED, EXCLUSIVE;
timeout represents the maximum time the node will wait to acquire the lock before giving up; and
cb is a callback object used by an application 22 to receive notifications from the LME in case a network/database problem occurs while the application 22 is retaining a lock.

When the lock requesting application 22 receives such a notification about a lock granted to the lock requesting application 22, since the lock acquired by the lock requesting application 22 is no longer valid, the lock requesting application 22 should interrupt its operations and release any resources associated with that lock as soon as possible.

The unlock( ) function releases an acquired lock, and has the following interface:
void unlock(int id)
wherein id is the ID of the granted lock.

In case of errors, the lock( ) and unlock( ) functions generate an exception.

To support the lock( ) and unlock( ) functions, each LME 13 may be implemented as a software module including a lock dispatcher 23, a local list 24 and a heartbeat generator 25. The lock dispatcher 23 is configured to receive and manage lock requests from applications 22 to acquire and, release locks. The local list 24 includes a data structure containing a list of the lock requests (related to both acquired and waiting locks) managed by the LME 13 in the corresponding node 11. Entries in the local list 24 are added and removed by the lock dispatcher 23. The heartbeat generator 25 is configured to read entries in the local list 24, and functions in an asynchronous thread that at pre-defined time intervals wakes-up and triggers generation of heartbeat signals for the node 1.

Figure 3:
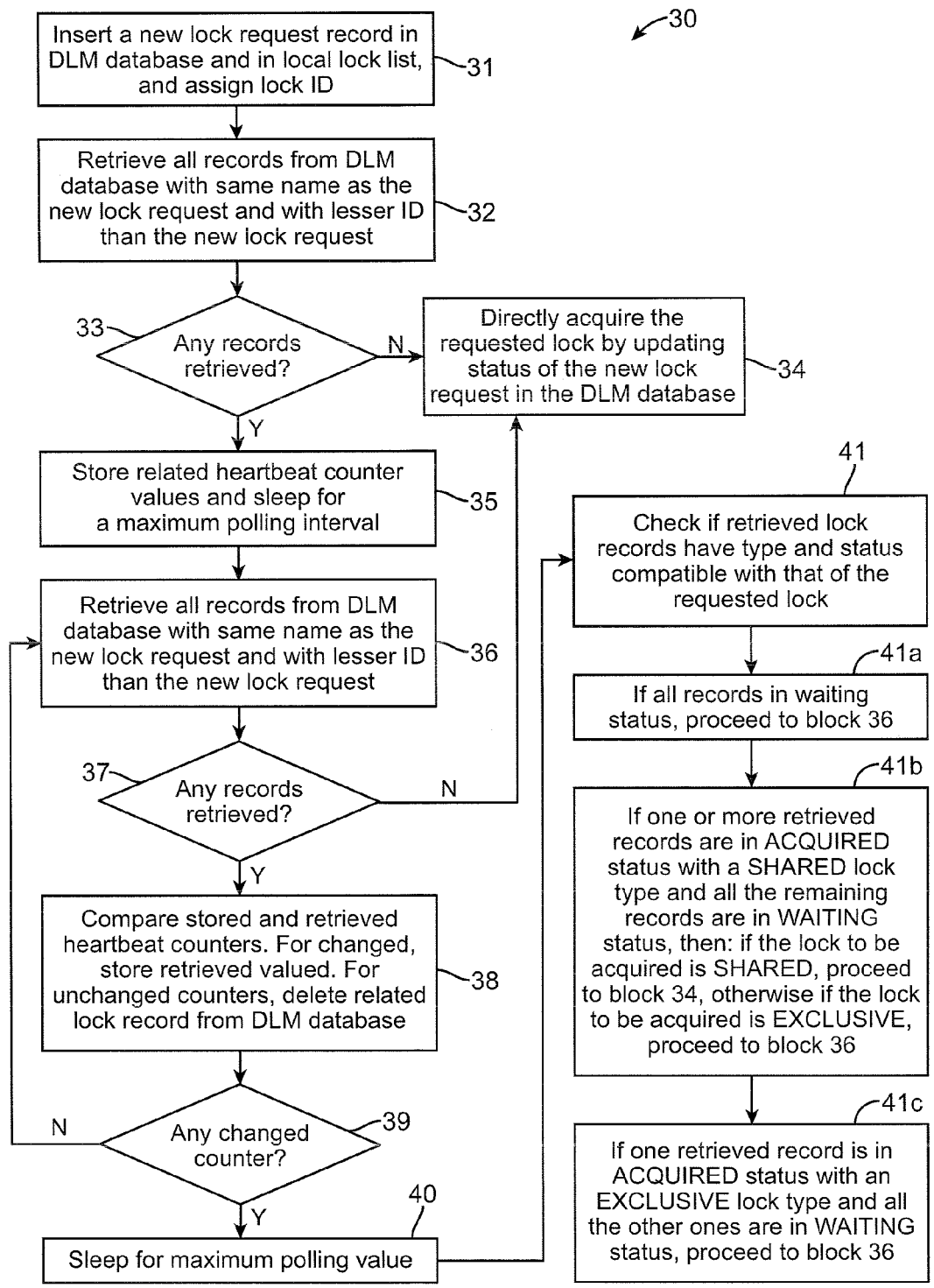
FIGS. 3-5 show flowcharts of a process for managing locks across distributed computing nodes, according to an embodiment of the invention.

The lock dispatcher 23, the local list 24 and the heartbeat generator 25 collaborate to manage three-processes: LOCK_ACQUIRE, LOCK_RELEASE, and HEARTBEAT_GENERATION. FIG. 3 shows a flowchart of an implementation of a LOCK_ACQUIRE process 30, including:
Block 31: For an application in a node requesting a lock for a resource, a new lock request record is inserted into the DLM database, wherein the new record includes requesting lock name, node name, lock type, polling interval and STATUS='WAITING'. Assign an ID for the lock request and provide to the requesting application. Add the lock request to the local lock list in the LME.

Block 32: All records related to lock requests with the same name as said new lock request having with an ID less than said assigned ID, are retrieved from the DLM database.

Block 33: Determine if any records are retrieved.

Block 34: If no records are retrieved, the requested lock is directly acquired by updating the status of the record to ACQUIRED in the DLM database, and returning control of the requested resource to the requesting application. End LOCK_ACQUIRE process.

Block 35: If any record is retrieved, then store the current values of the heartbeat counters of the record and sleep for a time period equal to the maximum polling interval specified by the retrieved records. The heartbeat counters are stored in the local lock list and their values are retrieved from the attribute called "HEARTBEAT_COUNTER" in the LOCKS table. As described further below in relation to block 38, these stored heartbeat counter values are thereafter checked against later ones from the DLM database to determine if their corresponding applications remain alive (i.e., if the stored and later heartbeat value for a lock records is the same, then the corresponding application is assumed to not be alive any longer).

Block 36: When the sleep timeout elapses, again retrieve all the records from DLM database with an ID less than the assigned one and the same name of the requesting lock.

Block 37: Determine if any records are retrieved. If no row is returned, then proceed to block 34.

Block 38: If any lock record is retrieved, then compare the related heartbeat counters from the retrieved records with the ones stored from the previous cycle. For all the changed counters (indicating that the corresponding applications are alive to have changed the counters), again store the corresponding retrieved counter values and lock request ID. For all the unchanged counters, remove/delete related records in the DLM database since such unchanged counters indicate applications (nodes) that are no longer active.

Block 39: Check if there is at least one changed counter. If yes, proceed to block 40, else proceed to block 36.

Block 40: If there is at least one changed counter (meaning that the corresponding requesting application/node is active), then sleep again for a timeout equal to the maximum polling interval specified by the still active records, and after that period elapses wake-up and proceed to perform the process blocks 36-38.

Block 41: Check if the type and status of each retrieved record is compatible with the type of the new lock requested to be acquired. Three cases are possible:

Block 41*a*: All the records are in WAITING status. In this case a lock cannot be acquired because there are other active lock requests that will acquire the lock. Proceed to block 36.

Block 41*b*: One or more records are in ACQUIRED status with a SHARED lock type and all the remaining records are in WAITING status. In this case, if the lock to be acquired is SHARED, proceed to block 34. If the lock to be acquired is EXCLUSIVE, proceed to block 36.

Block 41*c*: One record is in ACQUIRED status with an EXCLUSIVE lock type and all the other ones are in WAITING status. In this case, proceed to block 36.

Figure 4:
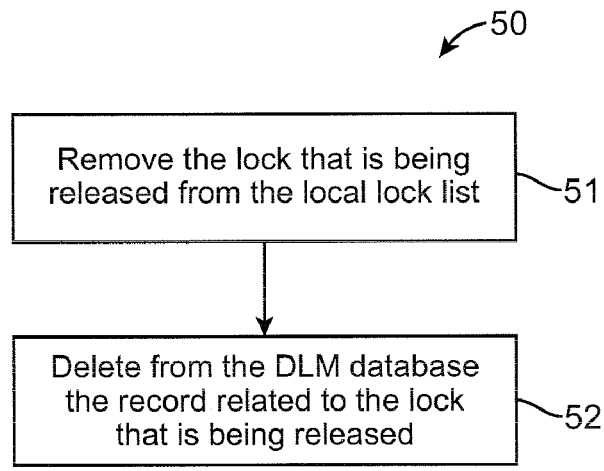

FIG. 4 shows a flowchart of an implementation of a LOCK_RELEASE process 50, including:

Block 51: Remove the lock that is being released from the local lock list.

Block 52: Delete the record related to the lock that is being released from the DLM database.

Figure 5:
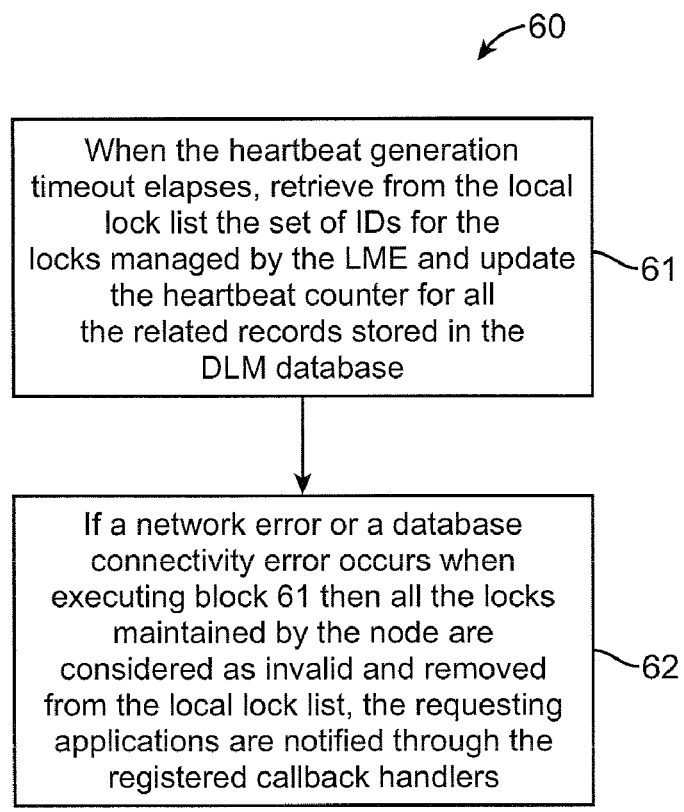

FIG. 5 shows a flowchart of an implementation of a HEARTBEAT_GENERATION process 60, including:

Block 61: When the heartbeat generation timeout elapses, retrieve from the local lock list the set of IDs for the locks managed by the LME and update the heartbeat counter for all the related records stored in the DLM database.

Block 62: If a network error or a database connectivity error occurs when executing block 61 then all the locks maintained by the node are considered as invalid and removed from the local lock list. The requesting applications are notified through the registered callback handlers.

All the activities described above are executed by each of the participant nodes each time the corresponding operation is requested. As such, the nodes cooperatively grants/releases locks without the need for a central lock manager entity.

All the participant nodes know the location and connection parameters of the DLM database. All the participant nodes share a common semantic for the meaning of the logical names of the requesting locks. More precisely, since each lock request is identified by a logical name, all the nodes must agree about the meaning of the chosen names so that the same name represents the same physical entity for all the nodes.

Other embodiments may have different prerequisites. For example, share a common semantic may not be required if the system was used to coordinate the activities executed by the participant nodes so that they are executed in sequence. In that case, the system would be used as a sequencer and the naming of the locks would not be significant. Only the assigned sequence numbers would be considered.

According to embodiments of the invention, a single point of failure is represented only by the DLM database system while all the logic is completely distributed into the nodes, and in case any of the nodes is not available, the overall DLS system is still able to continue operating. Moreover, using logical names to identify locks allows simultaneously managing locks that refer to heterogeneous resources (i.e., files, database elements, specific activities, etc.). An example scenario where a DLS system is applied involves a distributed application comprising several processes located on different nodes of a network. Each process is in charge of executing specific tasks on heterogeneous resources and only one process at a time can perform a specific activity on a specific resource. Using the DLS system it is very simple to create a concurrent distributed application where all the nodes are able to perform tasks in parallel on shared resources without interfering with one another. Moreover, if certain nodes become unavailable, the remaining nodes automatically take over the tasks that the nodes which became unavailable were performing. The DLS system further reduces the amount of software needed to implement such functionality.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of managing locks for one or more resources in a distributed system comprising a plurality of distributed computing nodes, the method comprising:

maintaining a database as a shared storage accessible by plural participating nodes for storing shared lock information;

each participating node locally managing a local list of locks; and responsive to a given lock manager engine within a given computing node receiving a request for a lock for a resource from an application executing within the given computing node, entering, by the given lock manager engine, a lock request record in the database, wherein the lock request record comprises a sequence entry number;

determining, by the given lock manager engine, whether the database stores any records associated with the resource having a sequence number less than the sequence entry number of the lock request record;

responsive to a determination that the database stores one or more records associated with the resource having a sequence number less than the sequence entry number of the lock request record, retrieving, by the given lock manager engine, the one or more records from the database to the local list of locks at the given computing node, wherein each of the one or more records in the local list of locks comprises a heartbeat counter associated with a corresponding requesting computing node; and checking, by the given lock manager engine, status of other nodes having lock request records within the one or more records in the local list of locks to determine whether the other nodes remain active based on heartbeat counters in the one or more records, wherein each given heartbeat counter comprises a value that is thereafter checked against a value from the database to determine if the corresponding computing node remains active, and for inactive nodes deleting, by the given lock manager engine, corresponding records from the database.

2. The method of claim 1, wherein the method further comprises:

responsive to a determination that one or more records associated with the resource having a sequence number less than the sequence entry number of the lock request record is in acquired status and of shared type and the request is of shared type, granting, by the given lock manager engine, the request for the lock to the application and indicating in the lock request record in the database that the lock is granted.

3. The method of claim 1, wherein the method further comprises:

responsive to a determination that the database stores no records associated with the resource having a sequence number less than the sequence entry number of the lock request record, granting, by the given lock manager engine, the request for the lock to the application and indicating in the lock request record in the database that the lock is granted.

4. The method of claim 1, wherein the method further comprises:

waiting for a timeout period and re-checking the database to determine whether the database stores any records associated with the resource having a sequence number less than the sequence entry number of the lock request record; and responsive to a determination that the database stores no records associated with the resource having a sequence number less than the sequence entry number of the lock request record, granting, by the given lock manager engine, the request for the lock to the application and indicating in the lock request record in the database that the lock is granted.

5. The method of claim 1, wherein the method further comprises:

releasing, by the given lock manager engine, the lock by removing the lock request record for the lock that is being released from the local lock list, and deleting, by the given lock manager engine, the lock request record from the database.

6. The method of claim 1, wherein the method further comprises managing heterogeneous locks not strictly related to a specific type of resource.

7. A system for managing locks for one or more resources in a computing environment, the system comprising:

a plurality of distributed computing nodes, wherein each node within the plurality of distributed computing nodes comprises a processor;

a database module configured as a shared storage accessible by plural participating nodes for storing shared lock information;

each participating node comprising a lock manager engine configured for locally managing a local list of locks, wherein responsive to a given lock manager engine within a given computing node receiving a request for a lock for a resource from an application executing within the given computing node, the given lock manager engine is configured to enter a lock request record in the database, wherein the lock request record comprises a sequence entry number;

wherein the given lock manager engine is configured to determine whether the database stores any records associated with the resource having a sequence number less than the sequence entry number of the lock request record;

wherein responsive to a determination that the database stores one or more records associated with the resource having a sequence number less than the sequence entry number of the lock request record, the given lock manager engine is configured to retrieve the one or more records from the database to the local list of locks at the given computing node, wherein each of the one or more records in the local list of locks comprises a heartbeat counter associated with a corresponding requesting computing node; and wherein the given lock manager engine is configured to check status of other nodes having lock request records within the one or more records in the local list of locks to determine whether the other nodes remain active based on heartbeat counters in the one or more records, wherein each given heartbeat counter comprises a value that is thereafter checked against a value from the database to determine if the corresponding computing node remains active, and for inactive nodes delete corresponding records from the database.

8. The system of claim 7, wherein:
responsive to a determination that one or more records associated with the resource having a sequence number less than the sequence entry number of the lock request record is in acquired status and of shared type and the request is of a shared type, the given lock manager engine is configured to grant the request for the lock to the application and indicates in the lock request record in the database that the lock is granted.

9. The system of claim 7, wherein:
responsive to a determination that the database stores no records associated with the resource having a sequence number less than the sequence entry number of the lock request record, the given lock manager engine is configured to grant the request for the lock to the application and indicate in the lock request record in the database that the lock is granted.

10. The system of claim 7, wherein:
the given lock manager is configured to wait for a timeout period and re-check the database to determine whether the database stores any records associated with the resource having a sequence number less than the sequence number of the lock request record; and
responsive to a determination that the database stores no records associated with the resource having a sequence number less than the sequence number of the lock request record, the given lock manager engine is configured to grant the request for the lock to the application and indicating in the lock request record in the database that the lock is granted.

11. The system of claim 7, wherein the given lock manager engine is further configured for releasing the lock by removing the lock request record for the lock that is being released from the local lock list, and deleting the lock request record from the database.

12. The system of claim 7, wherein the given lock manager engine is further configured for cooperating with other lock manager engines for managing heterogeneous locks not strictly related to a specific type of resource.

13. A computer program product for managing locks for one or more resources in a distributed system comprising a plurality of distributed computing nodes, comprising a non-transitory computer usable storage medium having a computer readable program stored thereon, wherein the computer readable program when executed on a given computing node within the plurality of distributed computing nodes, causes the given computing node to:
responsive to a given lock manager engine within the given computing node receiving a request for a lock for a resource from an application executing within the given computing node, enter, by the given lock manager engine, a lock request record in the database, wherein the lock request record comprises a sequence entry number;
determine, by the given lock manager engine, whether the database stores any records associated with the resource having a sequence number less than the sequence entry number of the lock request record;
responsive to a determination that the database stores one or more records associated with the resource having a sequence number less than the sequence entry number of the lock request record, retrieve, by the given lock manager engine, the one or more records from the database to the local list of locks at the given computing node, wherein each of the one or more records in the local list of locks comprises a heartbeat counter associated with a corresponding requesting computing node; and
check, by the given lock manager engine, status of other nodes having lock request records within the one or more records in the local list of locks to determine whether the other nodes remain active based on heartbeat counters in the one or more records, wherein each given heartbeat counter comprises a value that is thereafter checked against a value from the database to determine if the corresponding computing node remains active, and for inactive nodes delete, by the given lock manager engine, corresponding records from the database.

14. The computer program product of claim 13, wherein the computer readable program further causes the given computing node to:
responsive to a determination that one or more records associated with the resource having a sequence number less than the sequence entry number of the lock request record is in acquired status and of shared type and the request is of a shared type, grant, by the given lock manager engine, the request for the lock to the application and indicating in the lock request record in the database that the lock is granted.

15. The computer program product of claim 13, wherein the computer readable program further causes the given computing node to:
responsive to a determination that the database stores no records associated with the resource having a sequence number less than the sequence number of the lock request record, grant, by the given lock manager engine, the request for the lock to the application and indicate in the lock request record in the database that the lock is granted.

16. The computer program product of claim 13, wherein the computer readable program further causes the given computing node to:
release, by the given lock manager engine, the lock by removing the lock request record for the lock that is being released from the local lock list, and delete, by the given lock manager engine, the lock request record from the database.

17. The computer program product of claim 13, wherein the computer readable program further causes the given computing node to:
wait for a timeout period and re-checking the database to determine whether the database stores any records associated with the resource having a sequence number less than the sequence entry number of the lock request record; and
responsive to a determination that the database stores no records associated with the resource having a sequence number less than the sequence entry number of the lock request record, grant the request for the lock to the application and indicate in the lock request record in the database that the lock is granted.

18. The computer program product of claim 13, wherein the computer readable program further causes the given computing node to manage heterogeneous locks not strictly related to a specific type of resource.

* * * * *